United States Patent
Bao et al.

(10) Patent No.: US 10,609,739 B2
(45) Date of Patent: Mar. 31, 2020

(54) INTERNET PROTOCOL ADDRESS AND PORT-BASED IDENTITY SERVICE

(71) Applicant: Verizon Patent and Licensing Inc., Arlington, VA (US)

(72) Inventors: Guanqun Bao, Sunnyvale, CA (US); Raymond C. Counterman, Canton, MA (US); Jae Won Chung, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 209 days.

(21) Appl. No.: 15/052,959

(22) Filed: Feb. 25, 2016

(65) Prior Publication Data
US 2017/0251503 A1 Aug. 31, 2017

(51) Int. Cl.
*H04L 29/08* (2006.01)
*H04W 76/11* (2018.01)
*H04W 8/26* (2009.01)

(52) U.S. Cl.
CPC ............. *H04W 76/11* (2018.02); *H04W 8/26* (2013.01); *H04L 67/145* (2013.01)

(58) Field of Classification Search
USPC ................................................ 709/227, 228
See application file for complete search history.

(56) References Cited

U.S. PATENT DOCUMENTS

| | | | | |
|---|---|---|---|---|
| 2007/0109991 A1* | 5/2007 | Bennett | ............... | H04L 12/5692 370/328 |
| 2008/0317000 A1* | 12/2008 | Jackson | ............... | H04L 65/1016 370/352 |
| 2009/0059895 A1* | 3/2009 | Yasrebi | ............... | H04L 12/5691 370/352 |
| 2011/0271192 A1* | 11/2011 | Jones | ............... | G06F 3/0421 715/727 |
| 2013/0324114 A1* | 12/2013 | Raghothaman | ..... | H04W 76/023 455/426.1 |
| 2014/0237564 A1* | 8/2014 | Dudziak | ............... | H04L 63/08 726/6 |
| 2016/0127565 A1* | 5/2016 | Sharma | ............... | H04M 15/67 455/406 |

* cited by examiner

*Primary Examiner* — Angel T Brockman

(57) ABSTRACT

A method, a system, and a non-transitory storage medium provide an IP address and port-based identity service in which an anchor node of a wireless network stores identity information pertaining to a user of a mobile device in a centralized database. An authenticated and authorized web server may query the centralized database using the IP address or the IP address and port of an end device connected to the web server. The web server may obtain identity information pertaining to the user, such as a mobile telephone number.

20 Claims, 12 Drawing Sheets

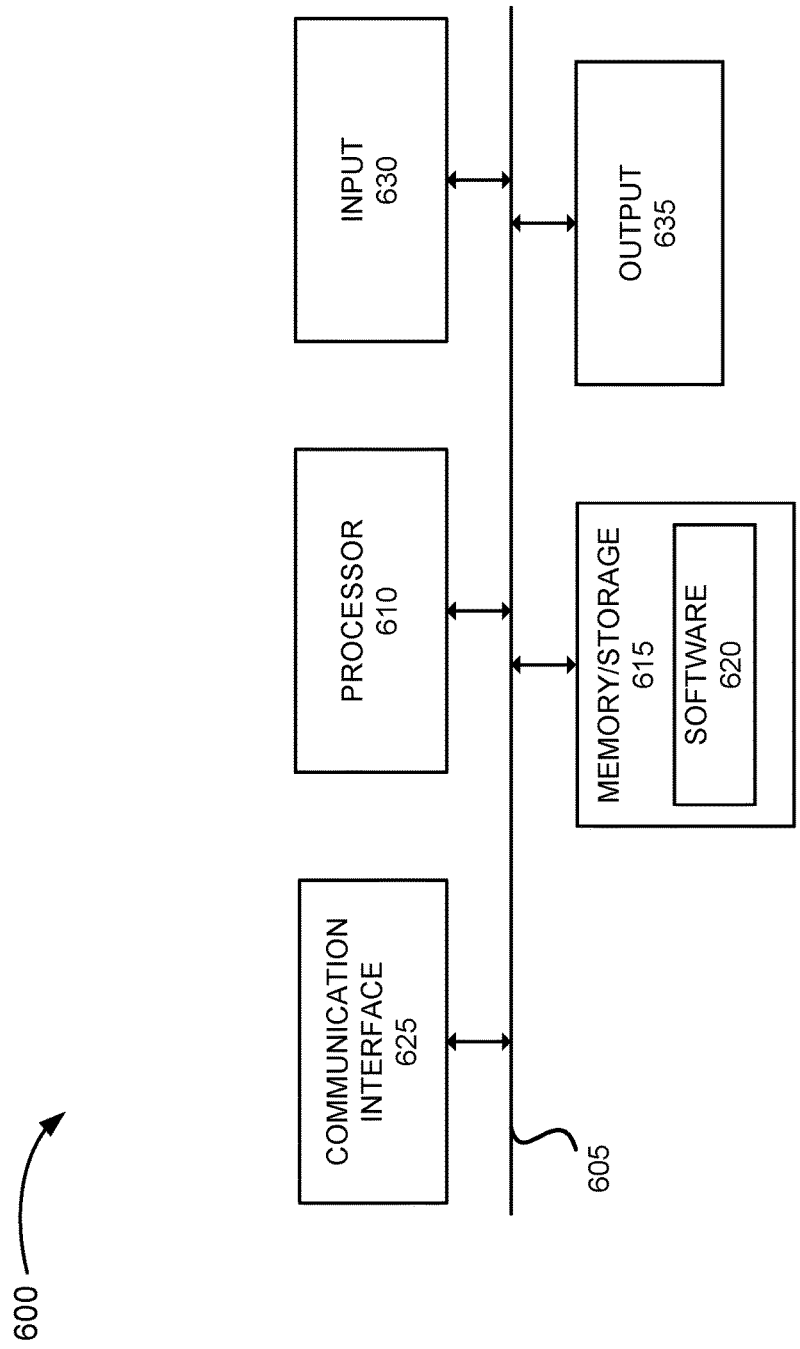

INTERNET PROTOCOL ADDRESS AND PORT-BASED IDENTITY SERVICE

BACKGROUND

Advertisers and other sales-related entities invest significant resources in identifying their consumers and creating relevant or targeted advertising. Currently, targeted mobile advertising typically uses third party cookies or device identifiers. However, the acceptance of third party cookies is decreasing in modern browsers. Additionally, device identifiers can be reset so that a backend tracking system is unable to link a consumer's past actions on the web.

BRIEF DESCRIPTION OF THE DRAWINGS

FIG. 6 is a diagram illustrating exemplary components of a device on which one or more of the network elements illustrated in the exemplary environments of FIGS. 1 and 2 may be implemented;

DETAILED DESCRIPTION OF PREFERRED EMBODIMENTS

The following detailed description refers to the accompanying drawings. The same reference numbers in different drawings may identify the same or similar elements. In addition, the following detailed description does not limit the invention.

There are various techniques to identify a user's device and associated user, such as a unique identifier header (UIDH) or an X-mobile directory number (X-MDN). However, these techniques have certain disadvantages. For example, the unique identifier header can be used only for Hypertext Transfer Protocol (HTTP) traffic. Additionally, the unique identifier header can be read from the client-side. As a result, an unauthorized party may abuse the usage of the unique identifier header, which could lead to privacy concerns, etc. While different identifiers, such as an X-mobile directory number may be more private than the unique identifier header, and can be used for HTTP Secure (HTTPS) traffic, they may suffer from some performance issues. For example, the X-mobile directory number requires one extra round trip between the client and the server. Thus, depending on the network conditions, the overall latency can be up to 600 milliseconds or longer. Given the significance of such latency, the X-mobile directory number may not adequately support certain business objectives (e.g., real-time bidding advertising, etc.).

Figure 1:
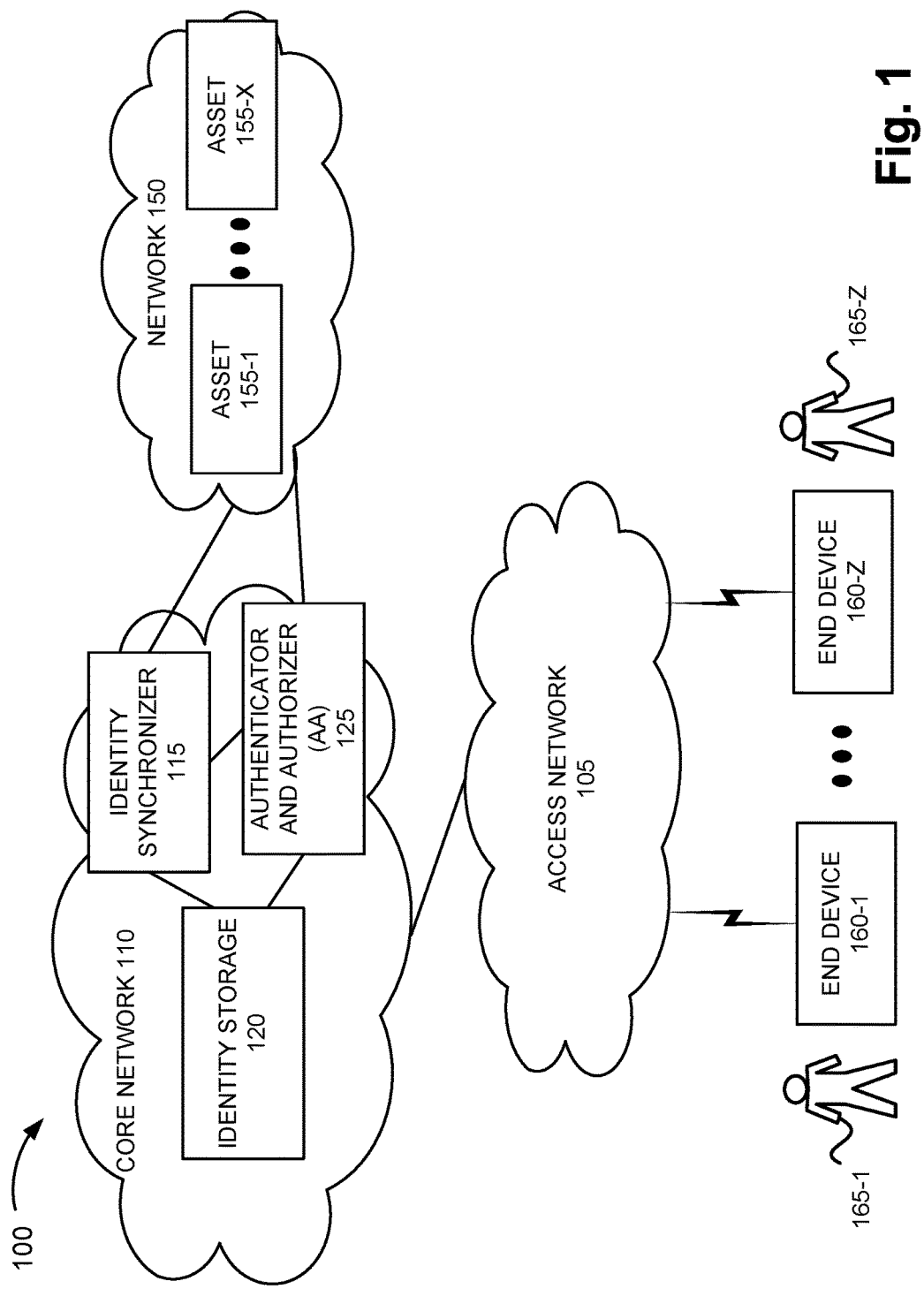
FIG. 1 is a diagram illustrating an exemplary environment in which an exemplary embodiment of an Internet Protocol (IP) address and port-based identity service may be implemented.

FIG. 1 is a diagram illustrating an exemplary environment 100 in which an exemplary embodiment of an IP address and port-based identity service may be implemented. As illustrated, environment 100 includes an access network 105, a core network 110, and a network 150. Core network 110 includes network elements. The network elements in core network 110 include an identity synchronizer 115, an identity storage 120, and an authenticator and authorizer (AA) 125. Network 150 includes network elements. The network elements in network 150 include assets 155-1 through 155-X (also referred to collectively as assets 155 and, individually and generically as asset 155). Environment 100 further includes end devices 160-1 through 160-Z (also referred to collectively as end devices 160 and, individually and generically as end device 160) and users 165-1 through 165-Z (also referred to collectively as user 165 and, individually and generically as user 165).

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of end devices, the number of networks, and the arrangement in environment 100 are exemplary. According to other embodiments, environment 100 may include additional network elements, fewer network elements, and/or differently arranged network elements than those illustrated in FIG. 1. Additionally, or alternatively, according to other embodiments, multiple network elements may be implemented on a single device, and conversely, a network element may be implemented on multiple devices. For example, identity storage 120 and AA 125 may be implemented on a single network device. Additionally, or alternatively, a network element may be implemented within a different network. For example, identity storage 120 and/or AA 125 may not be implemented in core network 110. Rather, identity storage 120 and/or AA 125 may be implemented in a network (not illustrated) external to core network 110.

Additionally, or alternatively, environment 100 may include an additional network and/or arrangement of networks that is/are different from that illustrated in FIG. 1. For example, access network 105 may be connected to another network (not illustrated). Additionally, or alternatively, one network may be combined with another network. For example, core network 110 and network 150 may be combined into a single network.

As further illustrated, environment 100 includes various communicative links. A network element and end device 160 may transmit and receive data via the communicative link. Environment 100 may be implemented to include wireless (e.g., radio, optical, etc.) and/or wired (e.g., electrical, optical, etc.) communicative links. The communicative link between network elements may be direct or indirect. For example, an indirect communicative link may involve an intermediary network element and/or an intermediary network not illustrated in FIG. 1. Additionally, the number of communicative links and the arrangement of communicative links illustrated in environment 100 are exemplary.

Access network 105 includes one or multiple networks of one or multiple types. For example, access network 105 may be implemented to include a wireless network. According to an exemplary implementation, access network 105 includes a radio access network (RAN). For example, the RAN may be a Third Generation (3G) RAN, a Fourth Generation (4G) RAN, a Fifth Generation (5G) RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, a Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like (e.g., a Worldwide Interoperability for Microwave Access (WiMAX access network, etc.). Depending on the implementation, access network 105 may include various network elements, such as a base station (BS), a base transceiver station (BTS), a Node B, an evolved Node B (eNB), a BS controller (BSC), a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 includes one or multiple networks of one or multiple types. For example, core network 110 may be implemented to include a wireless network and/or a wired network. According to an exemplary implementation, core network 110 includes a complimentary network pertaining to the one or multiple RANs described above. For example, core network 110 may include an evolved packet core (EPC) network of an LTE network or an LTE-A network, a GPRS core network, etc. Depending on the implementation, core network 110 may include various network elements, such as a packet data network gateway (PGW), a serving gateway (SGW), a mobility management entity (MME), a Gateway General Packet Radio Service (GPRS) Support Node (GGSN), a Serving GPRS Support Node (SGSN), a Packet Data Serving Node (PDSN), a High Rate Packet Data (HRPD) Serving Gateway (HSGW), etc, to provide core network functions, as well other network elements pertaining to various network-related functions, such as billing, security, network polices, subscriber profiles, etc. Core network 110 may also include other network elements to support internetworking between networks.

According to an exemplary embodiment, core network 110 includes network elements that provide the IP address and port-based identity service, such as identity synchronizer 115, identity storage 120, and AA 125. According to other embodiments, one or more of these network elements may reside in a network other than core network 110.

Identity synchronizer 115 includes logic that obtains identity information. According to an exemplary embodiment, the identity information includes network address information, telephone number information and, a user identifier and/or an end device identifier. According to an exemplary implementation, the network address information includes an IP address allocated to end device 160. For example, the IP address may be an IP version 4 (IPv4) address, an IP version 6 (IPv6) address, and/or a network address translated (NAT'ed) IPv4 address. According to another exemplary implementation, the network address information includes an IP address and port information allocated to end device 160. For example, the port information includes a port number or a NAT'ed port number. Alternatively, the port information may include a NAT port number start and a NAT port number range. For example, a pool of port numbers may be chunked into groups in which each group has a start port number and an end port number (e.g., 0-511, etc.). According to such an example, the NAT port number start may indicate the start port number of the group (e.g., 0) and the NAT port number range may indicate the number of port numbers included in the group (e.g., 512). According to an exemplary implementation, the telephone number information includes a mobile directory number (MDN) or a Mobile Station International Subscriber Directory Number (MSISDN). According to an exemplary implementation, the user identifier includes an International Mobile Subscriber Identity (IMSI) or the like. According to an exemplary implementation, the end device identifier includes an International Mobile Station Equipment Identity (IMEI), a Mobile Equipment Identifier (MEID), and/or the like. According to an exemplary embodiment, identity synchronizer 115 performs a look-up in a database to obtain identity information. For example, the database may store a mapping between telephone number information and, the user identifier and/or the end device identifier.

Identity synchronizer 115 includes logic that provides the identity information to identity storage 120. For example, identity synchronizer 115 generates and transmits a message, which carries the identity information, to identity storage 120. According to one example, identity synchronizer 115 may be implemented in a PGW of an LTE core network. However, as previously described, core network 110 may include one or multiple networks of one or multiple types. In this regard, according to other examples, depending on the type of network architecture used, identity synchronizer 115 may be implemented in another network element, such as a GGSN, a Home Agent (HA) of a Mobile IP network, or the like. According to even other examples, identity synchronizer 115 may be implemented as a stand-alone network element in core network 110.

Identity storage 120 includes logic that stores and updates identity information. For example, identity storage 120 includes logic to process, extract, and store identity information carried in messages received from identity synchronizer 115. According to one example, identity storage 120 may be implemented to include a database management system (DBMS). The DBMS may be implemented using conventional, well-known, or commercially available relational or NoSQL software/packages (e.g., Microsoft SQL, Oracle Database, Cassandra, MongoDB, etc.). Identity storage 120 includes a mass storage device that stores a database. The database stores identity information. According to an exemplary embodiment, the identity information includes mappings between network address information, telephone number information and, user identifiers and/or end device identifiers. For example, the network address assigned to end device 160 is mapped to the telephone number information and, other identity information pertaining to end device 160 and/or user 165.

Identity storage 120 includes logic to manage queries directed to the database. For example, identity storage 120 includes logic to process query requests received from AA 125. According to an exemplary implementation, identity storage 120 exposes a web service, based on an application programming interface (API), which allows assets 155 to query, via AA 125, the database that stores identity information. According to an exemplary embodiment, a query request includes network address information of end device 160. Identity storage 120 includes logic to perform searches or look-ups in the database to determine whether the network address information is mapped to identity information (e.g., telephone number information) stored in the database. Identity storage 120 includes logic to generate query responses based on the results of searches or look-ups. For example, when there is a match, identity storage 120 generates and transmits a query response to AA 125, which is subsequently forwarded to asset 155. According to an exemplary embodiment, the query response includes the telephone number information (e.g., an MDN, an MSISDN, etc.). According to one example, identity storage 120 may be implemented as a stand-alone network element.

AA 125 includes logic that authenticates asset 155. For example, AA 125 includes logic to receive credentials from asset 155. According to an exemplary implementation, the credentials include an asset identifier and a secret key. According to other exemplary implementations, other types of credentials and well-known techniques may be used to authenticate asset 155. AA 125 determines whether to authenticate (e.g., validate or not validate) asset 155 based on the credentials received. For example, AA 125 compares the credentials from asset 155 with credentials stored in a database. The credentials stored in the database are credentials that are registered and issued to assets 155 for use when invoking the IP address and port-based identity service. When asset 155 is authenticated, AA 125 includes logic to issue an access token to asset 155.

AA 125 includes logic that authorizes access to identity storage 120. For example, AA 125 includes logic that receives query requests from asset 155. The query request includes the access token and the network address information of end device 160. For example, as previously described, the network address information may include an IP address of end device 160 or the IP address and port information of end device 160. AA 125 includes logic to determine whether the access token is valid. For example, AA 125 compares the access token received to the access token issued. The access token issued may be stored in the database previously described. When the access token is determined to be valid, AA 125 includes logic to communicate a query request to identity storage 120, which is used by identity storage 120 to perform the look-up. The query request includes the network address information. AA 125 includes logic to receive a query response from identity storage 120, based on the result of the look-up performed, and communicate the query response to asset 155. When the result of the look-up is successful, the query response includes the telephone number information associated with user 165. When the result of the look-up is not successful, the query response includes data indicating that the look-up was not successful (e.g., an error message, etc.).

According to one example, AA 125 may be implemented as an AA server. Since various core network architectures include an authentication, authorization, and accounting (AAA) server, AA 125 may be implemented in the AAA server. According to other exemplary implementations, AA 125 may be implemented as a network element separate or distinct from the AAA server. Additionally, as previously described, according to an exemplary implementation, identity storage 120 and/or AA 125 may be implemented in a network external from core network 110.

Network 150 includes one or multiple networks of one or multiple types. For example, network 150 may be implemented as the Internet or other IP-based network that provides access to various services, applications, etc. Asset 155 includes a network element that provides an end user asset (e.g., a service, an application, data, etc.). For example, asset 155 may be implemented as a web server that provides web pages. For example, the web server or other type of HTTP-based network element may pertain to a merchant (e.g., a store, etc.), a non-merchant (e.g., a bank, etc.), or some other type of business. For purposes of description, asset 155 does not provide a communication service (e.g., telephone, Voice-over IP, video conferencing, or the like) in which asset 155 would obtain a mobile telephone number of user 165 during a session between asset 155 and end device 160.

According to an exemplary embodiment, asset 155 registers for the IP address and port-based identity service. As a result of successfully registering with the IP address and port-based identity service, asset 155 is issued credentials for use when invoking the IP address and port-based identity service. For example, asset 155 may invoke the IP address and port-based identity service when a connection between asset 155 and end device 160 is established. Asset 155 includes logic that obtains network address information of end device 160 based on the connection, requests authentication from AA 125, and when successfully authenticated, queries identity storage 120 via AA 125 for telephone number information.

End device 160 includes a device that has computational and wireless communicative capabilities. End device 160 may be implemented as a mobile device, a portable device, or a stationary device. For example, end device 160 may be implemented as a smartphone, a personal digital assistant, a tablet, a netbook, a phablet, an infotainment system in a vehicle, or a wearable device (e.g., a watch, glasses, etc.). Alternatively, for example, end device 160 may be implemented as a set top box, a smart television, and so forth. User 165 is a person that operates end device 160. According to an exemplary embodiment, end device 160 includes a web browser. For purposes of description, end device 160 is not considered a network element.

An exemplary process according to an exemplary embodiment of the IP address and port-based identity service is described. For purposes of description, assume that identity synchronizer 115 is implemented in an anchor node (e.g., a PGW, a GGSN, or a Mobile Agent). Referring to FIG. 1, according to an exemplary embodiment, when a PDN connection is established between end device 160 and the anchor node, identity information is obtained. The identity information includes network address information, telephone number information and, the user identifier and/or the end device identifier, as previously described. Identity synchronizer 115 may obtain identity information in various ways. For example, the user identifier and/or the end device identifier may be carried in a request message to establish the PDN connection. Additionally, for example, the anchor node may assign a network address or network address and port to end device 160. Additionally, for example, the anchor node may store or access a database that maps telephone number information to other identity information (e.g., the user identifier, the end device identifier, etc.). Subsequent to obtaining the identity information, identity synchronizer 115 of the anchor node generates and transmits a packet, which carries the identity information, to identity storage 120. Identity storage 120 stores the identity information.

User 165 establishes a connection via end device 160 and the anchor node to asset 155. For example, user 165 uses a web browser to establish an HTTP session with asset 155. In response to connecting to end device 160, asset 155 performs an authentication process. For example, asset 155 generates and transmits an authentication request, which carries its credentials, to AA 125. In response to receiving the authentication request, AA 125 authenticates asset 155.

When asset 155 is successfully authenticated, asset 155 queries identity storage 120 via AA 125. For example, asset 155 obtains the network address information of end device 160 to which it is connected. Asset 155 generates and transmits a query request, which includes the network address information of end device 160 and an access token, to AA 125. When the access token is validated, AA 125 generates and transmits a query request, which includes the network address information, to identity storage 120. In response to receiving the query request, identity storage 120 performs a search and determines whether the network address information is stored in the database. When there is a match between the network address information carried in the query request with the network address information stored in the database, identity storage 120 generates and transmits a query response to asset 155 via AA 125. The query response includes the telephone number information of user 165. Asset 155 may subsequently use the telephone number for its business purpose. For example, asset 155 may use the telephone number information to transmit advertising (e.g., via Simple Messaging Service (SMS), Multimedia Messaging Service (MMS), etc.), fraud detection, account origination, authentication, and so forth.

In view of the foregoing, the IP address and port-based identity service may enhance the mobile targeting problem. For example, unlike cookies and device identifiers, a user's mobile identity may yield a more permanent and reliable user identifier. Additionally, unlike the privacy issues stemming from use of the unique identifier header, only authorized third parties can use the IP address and port-based identity service. Additionally, for example, unlike the latency issues stemming from use of the X-mobile directory number technique, a persistent connection between servers can eliminate the Transfer Control Protocol/Secure Link (TCP/SSL) negotiation time and reduce latency when an IP address and port number look-up is invoked. Further, the IP address and port-based identity service may be supported for HTTP traffic, HTTPS traffic, and so forth.

Figure 2:
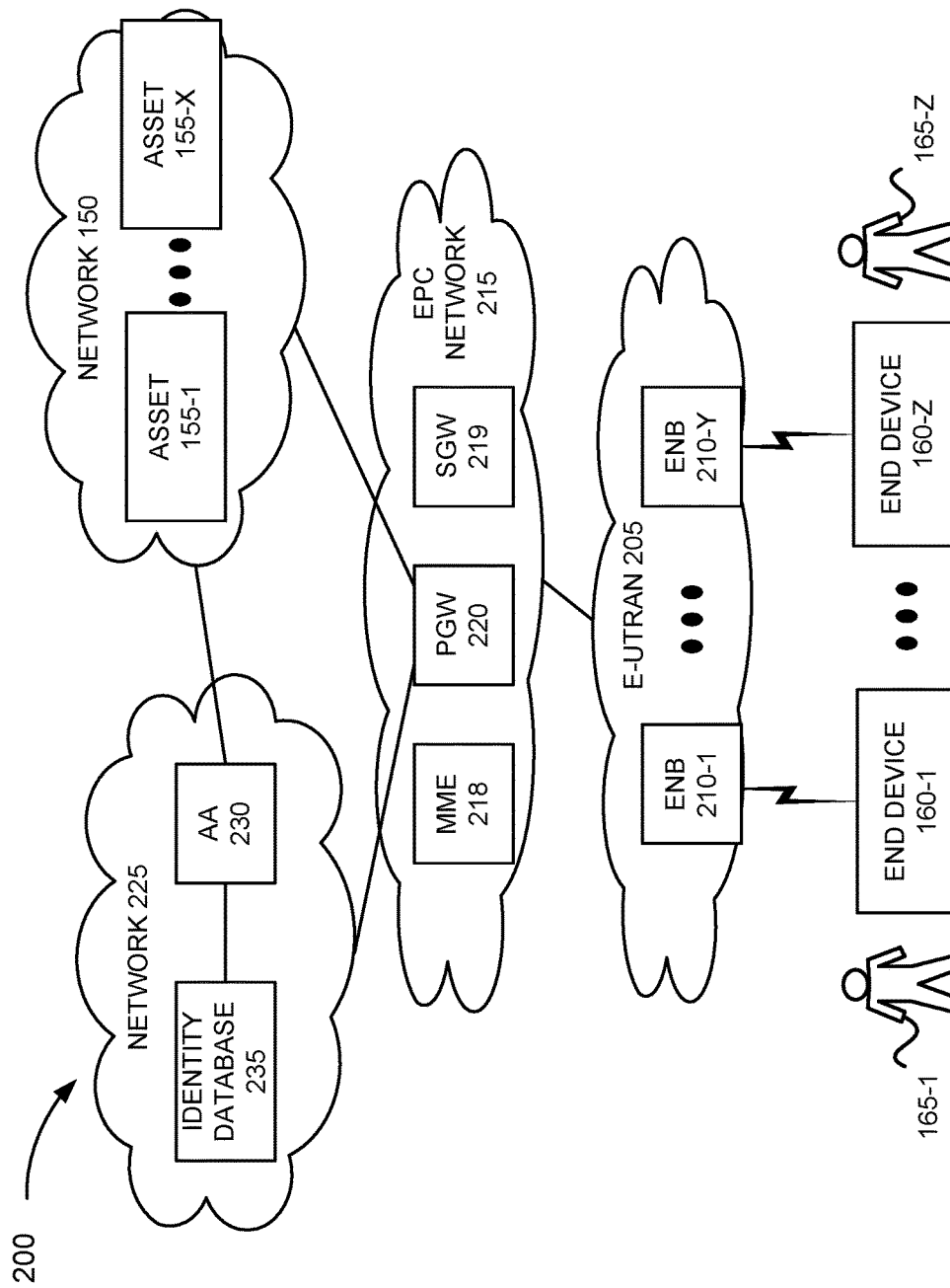
FIG. 2 is a diagram illustrating another exemplary environment in which an exemplary embodiment of the IP address and port-based identity service may be implemented.

FIG. 2 is a diagram illustrating an exemplary environment 200 in which an exemplary embodiment of the IP address and port-based identity service may be implemented. As illustrated, environment 200 includes an E-UTRAN 205, an EPC network 215, and a network 225. Environment 200 further includes network 150, third party assets 155, end devices 160, and users 165, which have been previously described.

E-UTRAN 205 includes eNBs 210-1 through 210-Y (also referred to collectively as eNBs 210 and, individually and generically as eNB 210). ENB 210 may operate according to a Third Generation Partnership Project (3GPP) specification or LTE architecture.

EPC network 215 includes various network elements according to a Third Generation Partnership Project (3GPP) specification or an LTE architecture. For example, EPC network 215 includes an MME 218, an SGW 219, and a PGW 220. MME 218, SGW 219, and PGW 220 may operate according to a Third Generation Partnership Project (3GPP) specification or LTE architecture. According to an exemplary embodiment, PGW 220 includes identity synchronizer 115, which provides the IP address and port-based identity service. According to an exemplary embodiment, PGW 220 provides packet data network connections to a particular external network and/or a particular type of traffic (e.g., web-based traffic, etc.). According to an exemplary implementation, the particular network is the Internet. Although not illustrated, EPC network 215 may also include other network elements, such as a home subscriber server (HSS), a policy charging and rules function (PCRF), an AAA server, an offline charging system (OFCS), and so forth.

Network 225 provides access to an AA 230 and an identity database 235. For example, network 225 may be an IP-based network, an HTTP-based network, a service provider network, or other suitable data network. AA 230 may be implemented as an authentication and authorization server that includes AA 125, which provides the IP address and port-based identity service. Identity database 235 may be implemented to include a DBMS and a database that includes identity storage 120 and provides the IP address and port-based identity service.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of end devices, the number of networks, and the arrangement in environment 200 are exemplary. According to other embodiments, environment 200 may include additional network elements, fewer network elements, and/or differently arranged network elements than those illustrated in FIG. 2. Additionally, or alternatively, according to other embodiments, multiple network elements may be implemented on a single device, and conversely, a network element may be implemented on multiple devices. For example, AA 230 and identity database 235 may be implemented on a single network device. Additionally, or alternatively, a network element may be implemented within a different network. For example, AA 230 and/or identity database 235 may be implemented in EPC network 215.

Additionally, or alternatively, environment 100 may include an additional network and/or arrangement of networks that is/are different from that illustrated in FIG. 2. For example, one network may be combined with another network. For example, EPC network 215 and network 225 may be combined into a single network, or network 150 and network 225 may be combined into a single network.

As further illustrated, environment 200 includes various communicative links. A network element and end device 160 may transmit and receive data via the communicative link. Environment 200 may be implemented to include wireless (e.g., radio, optical, etc.) and/or wired (e.g., electrical, optical, etc.) communicative links. The communicative link between network elements may be direct or indirect. For example, an indirect communicative link may involve an intermediary network element and/or an intermediary network not illustrated in FIG. 2. Additionally, the number of communicative links and the arrangement of communicative links illustrated in environment 100 are exemplary.

In view of environment 200, a further description of an exemplary process of the IP address and port-based identity service is provided. As the phrase "packet data network connection" or "PDN connection" in the LTE context is used, the packet data network connection may include a default bearer or a default bearer and one or multiple dedicated bearers. According to an exemplary implementation, the IP address allocated for the default bearer is also used for a dedicated bearer within the same packet data network connection when the dedicated bearer connects to the same network as the default bearer. For example, the network may be the Internet. Additionally, end device 160 may establish multiple packet data network connections. For example, end device 160 may connect to the Internet and an IP Multimedia Subsystem (IMS) network. Furthermore, end device 160 may establish a packet data network connection with respect to one PGW 220 and establish another packet data network connection with respect to another (different) PGW 220.

Figure 3:
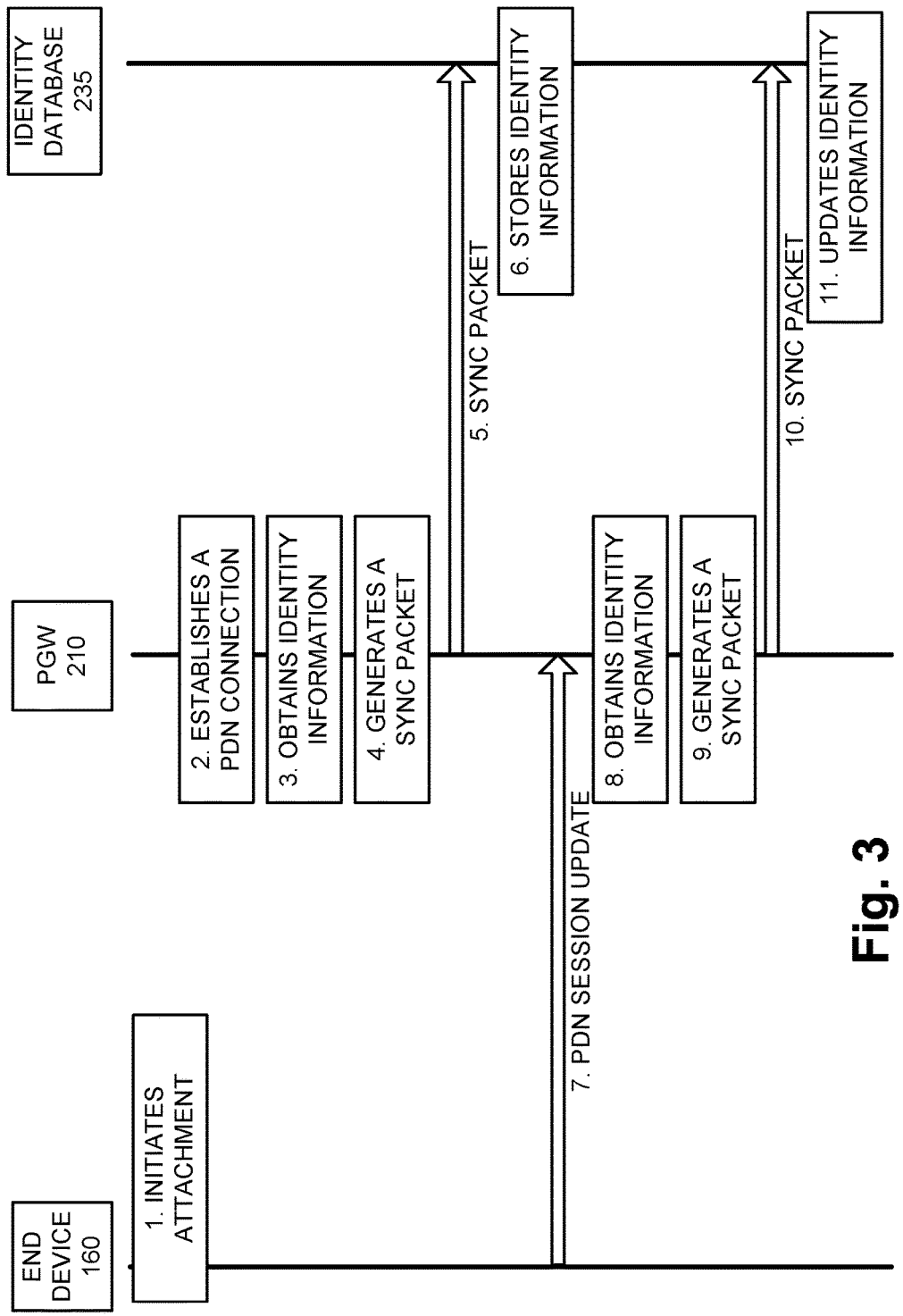
FIG. 3 is a diagram illustrating an exemplary process of the IP address and port-based identity service.

FIG. 3 is a diagram illustrating an exemplary process of the IP address and port-based identity service in which identity information is obtained and stored at identity database 235. For example, FIG. 3 illustrates the process corresponding to when end device 160 initially attaches to E-UTRAN 205 and EPC network 215.

As illustrated in FIG. 3, in step 1, user 165 initiates, via end device 160, an attachment to E-UTRAN 205. For example, although not illustrated, but according to LTE procedures, end device 160 initiates a radio resource control (RRC) connection establishment procedure. ENB 210 transmits an Attach Request, which includes a PDN Connectivity Request, to MME 218. Subsequent to authentication of end device 160/user 165, SGW 219 transmits a Create Session Request message to PGW 220 via SGW 219, which triggers PGW 220 to establish a PDN connection with end device 160 (illustrated as step 2). The Create Session Request may carry various data including the IMSI of end device 160, PDN Type (e.g., IPv4, etc.), and so forth. PGW 220 allocates an IP address or an IP address and a port to end device 160, creates a new entry in its Evolved Packet System (EPS) bearer context table, generates a charging identifier, and generates and transmits a Create Session Response message, which carries various data (e.g., IP address, etc.) to SGW 219.

In step 3, PGW 220 obtains identity information. For example, PGW 220 may obtain identity information (e.g., a user identifier, such as an IMSI, the telephone number of the user (e.g., MDN), an end device identifier, etc.) from messages received pertaining to the establishment of the packet data network connection. Additionally, PGW 220 obtains network address information of end device 160 during a network address assignment procedure. PGW 220 may also obtain the telephone number information and/or other identity information (e.g., an end device identifier, etc.) from a database. PGW 220 may temporarily store the identity information.

Figure 5A:
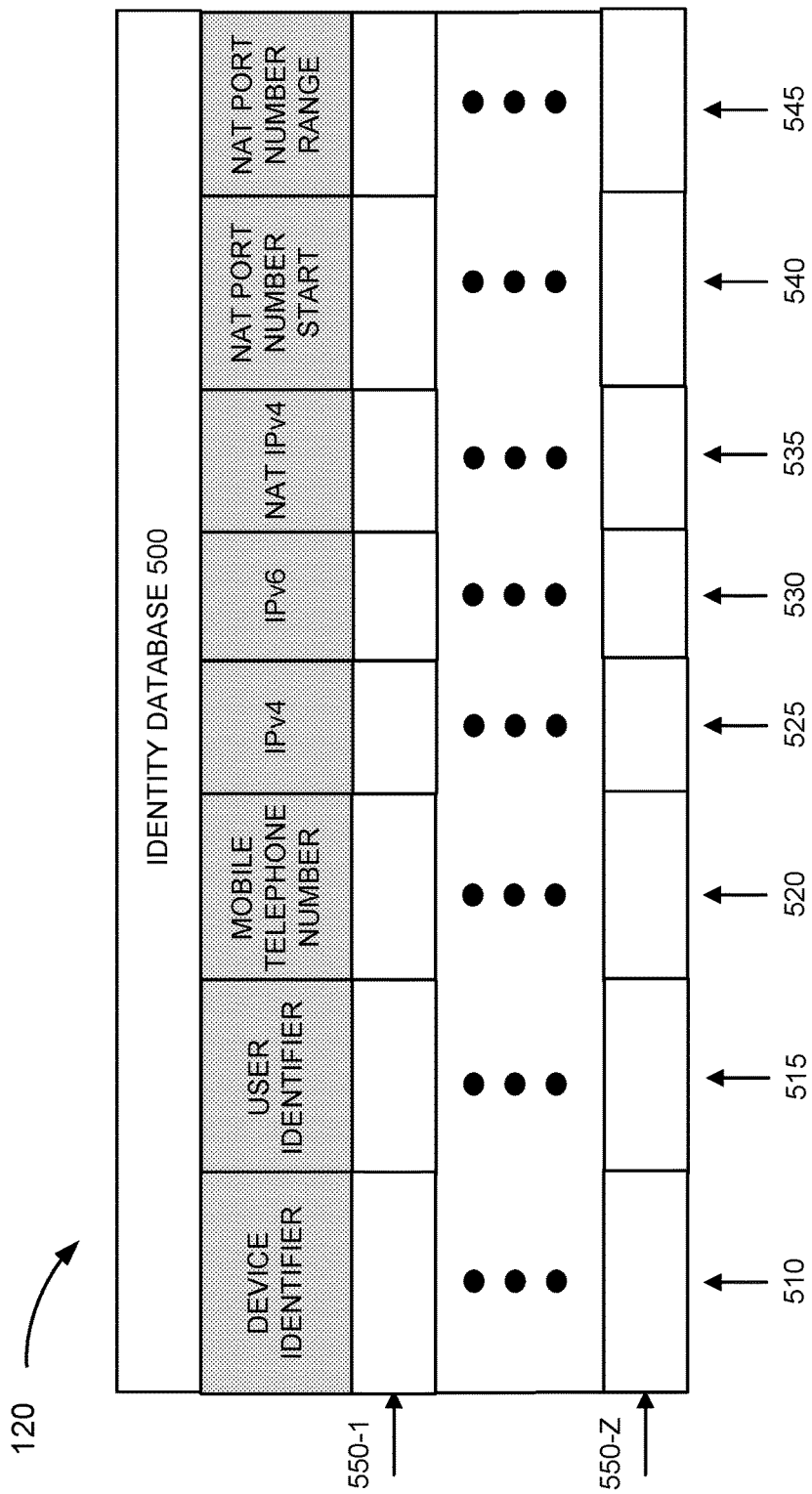
FIG. 5A is a diagram illustrating an exemplary database that stores exemplary identity information.
Figure 5B:
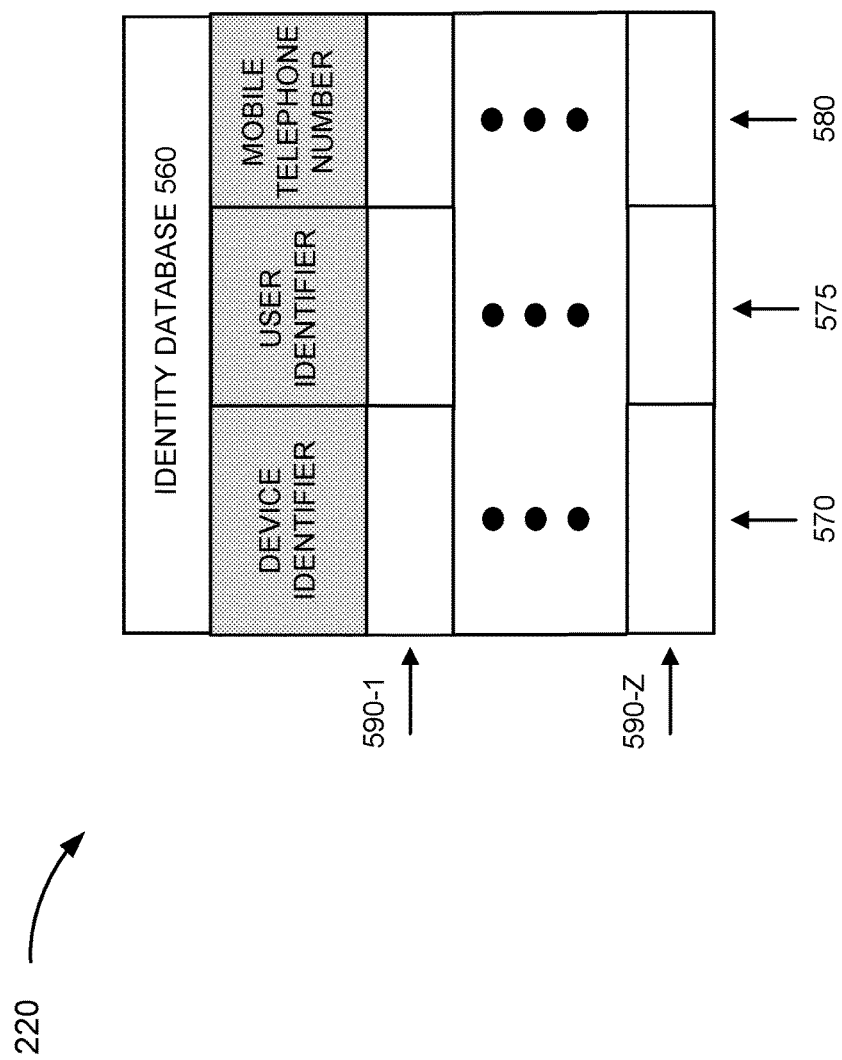
FIG. 5B is a diagram illustrating another exemplary database that stores exemplary identity information.

FIG. 5B is a diagram illustrating exemplary identity information that is stored in an exemplary identity database 560. For example, PGW 220 may store identity database 560 or identity database 560 may be stored by another network element. As illustrated, identity database 560 includes a device identifier field 570, a user identifier field 575, and a mobile telephone number field 580. According to this example, database 560 includes profiles 590-1 through 590-X (also referred to as profiles 590 and, individually and/or generically as profile 590). Each profile 590 includes a grouping of data fields 570 through 580. Each profile 590 may include at least one instance of data that is different from another profile 590. According to other implementations, the identity information may include additional instances of data, fewer instances of data, and/or different types of data. For example, according to other implementations, database 560 may not include device identifier field 570 or user identifier field 575.

Device identifier field 570 stores a device identifier of end device 160. For example, the device identifier may be implemented as an IMEI, a MEID, or the like (e.g., an Electronic Serial Number (ESN), a Media Access Control (MAC) address, an Integrated Circuit Card Identifier (IC-CID), etc.). User identifier field 575 stores a user identifier of user 165. For example, user identifier may be implemented as an IMSI or the like. Mobile telephone number field 580 stores a mobile telephone number associated with end device 160 and/or user 165. For example, the directory number may be implemented as an MDN, and MSISDN, or the like. In this way, database 560 includes a mapping between a unique identifier associated with user 165 or end device 160 and the telephone number of user 165. Thus, as previously described, PGW 220 may obtain identity information by performing a lookup for identity information in identity database 560. According to an exemplary implementation, PGW 220 may use a user identifier and/or an end device identifier as a key to query and determine whether the telephone number of user 165 is stored in identity database 560. For example, PGW 220 compares the IMSI included in a received Create Session request to perform the lookup. PGW 220 obtains the telephone number of user 165 in response to determining that the telephone number is stored in identity database 560.

Referring back to FIG. 3, in step 4, PGW 220 generates a sync packet in response to the obtainment of the identity information. According to an exemplary implementation, the sync packet includes the network address information (e.g., an IP address or an IP address and port information), telephone number information and, a user identifier of user 165 and/or an end device identifier of end device 160. In step 5, PGW 220 transmits the sync packet to identity database 235 in response to generating the sync packet. Identity database 235 receives the sync packet, and in response stores the identity information carried in the sync packet in a database (illustrated in step 6).

As previously mentioned, depending on the behavior of user 165, PGW 220 may repeat steps 2-5 when a new packet data network connection is established and end device 160 is assigned new network address information. According to another example, when a packet data network connection is torn down, PGW 220 may update identity database 235. For example, in step 8, in response to PGW 220 determining that the packet data network connection is torn down, PGW 220 obtains identity information. For example, the identity information may include the network address information and, the telephone number information, the user identifier, and/or the end device identifier. In step 9, PGW 220 generates a sync packet that includes the identity information. In step 10, PGW 220 transmits the sync packet to identity database 235. In step 11, in response to receiving the sync packet, identity database 235 updates the identity information. For example, identity database 235 may delete one or multiple profiles 550 applicable to the identity information and the packet data network connection stored in database 500.

As described, identity database 235 stores identity information in response to receiving the sync packet from PGW 220. FIG. 5A is a diagram illustrating exemplary identity information that is stored in an exemplary identity database 500. For example, identity database 235 includes identity database 500. As illustrated, identity database 500 includes a device identifier field 510, a user identifier field 515, a mobile telephone number field 520, an IPv4 field 525, an IPv6 field 530, a NAT IPv4 field 535, a NAT port number start field 540, and a NAT port number range field 545. According to this example, database 500 includes profiles 550-1 through 550-X (also referred to as profiles 550 and, individually and/or generically as profile 550). Each profile 550 includes a grouping of data fields 515 through 545. Each profile 550 may include at least one instance of data that is different from another profile 550. According to other implementations, the identity information may include additional instances of data, fewer instances of data, and/or different types of data. For example, according to other implementations, database 500 may include a port number field (e.g., that stores a port number) and/or a NAT port number field (e.g., that stores a NAT'ed port number). Additionally, or alternatively, database 500 may not include device identifier field 510 or user identifier field 515.

Device identifier field 510 stores a device identifier of end device 160. For example, the device identifier may be implemented as an IMEI, a MEID, or the like (e.g., an Electronic Serial Number (ESN), a Media Access Control (MAC) address, an Integrated Circuit Card Identifier (IC-CID), etc.). User identifier field 515 stores a user identifier of user 165. For example, user identifier may be implemented as an IMSI or the like.

Mobile telephone number field 520 stores a mobile telephone number associated with end device 160 and/or user 165. For example, the directory number may be implemented as an MDN, and MSISDN, or the like. IPv4 field 525 stores an IPv4 address assigned to end device 160 and associated with a packet data network connection. IPv6 field 530 stores an IPv6 address assigned to end device 160 and associated with a packet data network connection. NAT IP field 535 stores a NAT'ed IPv4 address assigned to end device 160 and associated with a packet data network connection. NAT port number start field 540 stores a NAT start port number, which is associated with a port number group, assigned to end device 160 and associated with a packet data network connection. NAT port number range field 545 stores a NAT port number range assigned to end device 160 and associated with a packet data network connection.

Figure 4A:
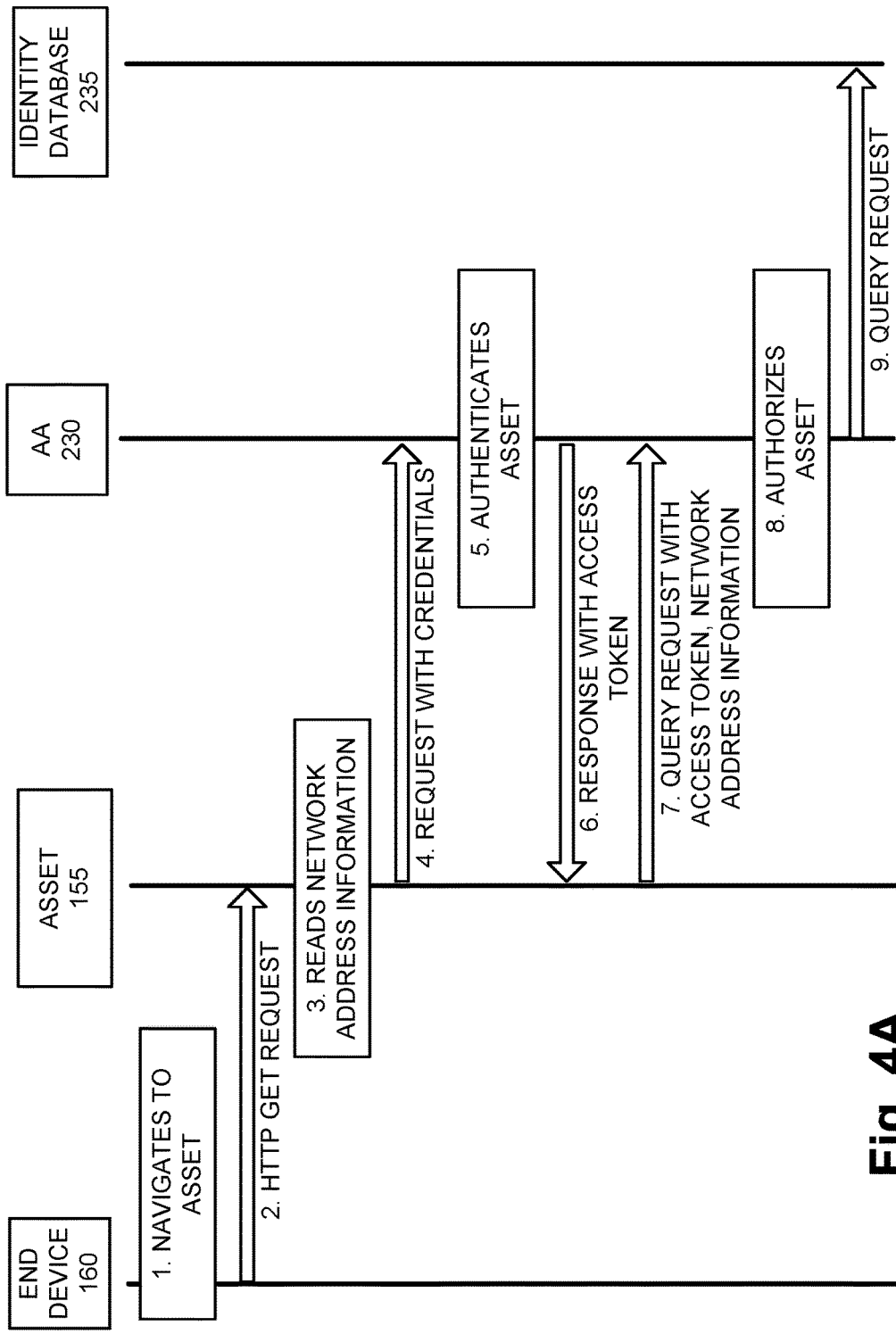
FIGS. 4A and 4B are diagrams illustrating another exemplary process of the IP address and port-based identity service.
Figure 4B:
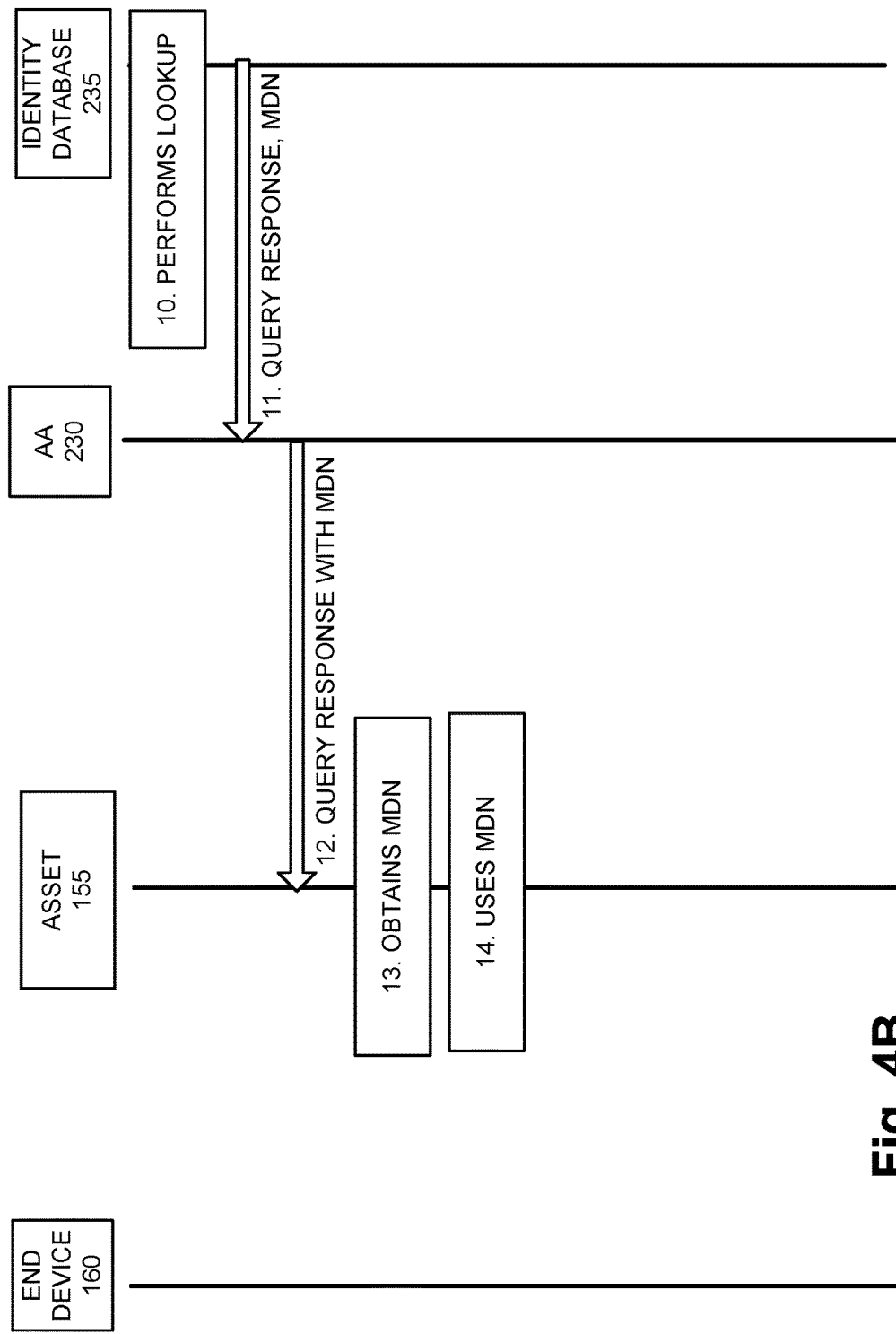

FIGS. 4A and 4B are diagrams illustrating an exemplary process of the IP address and port-based identity service in which identity information is obtained by asset 155. According to this example, assume that a packet data network connection exits between end device 160 and a packet data network (e.g., the Internet). Referring to FIG. 4A, in step 1, assume user 165 navigates to asset 155. User 165 selects a link from a web page displayed via end device 160, which results in an HTTP GET request transmitted from end device 160 to asset 155 (illustrated as step 2). In step 3, asset 155 reads the network address information of end device 160. For example, an IP address of end device 160 is included in an IP packet header, and a source port number of end device 160 is included in a TCP header. In step 4, in response to reading the network address information, asset 155 generates and transmits to AA 230 a request to be authenticated. According to an exemplary implementation, the request is transmitted via a secure connection (e.g., HTTPS, etc.). The connection may also be a persistent connection (e.g., an HTTP persistent connection). The request includes the credentials of asset 155. As an example, the request may be an HTTPS GET request.

In step 5, in response to receiving the request and credentials, AA 230 performs authentication. For example, AA 230 determines whether the credentials are valid. According to this example, in step 6, assume the credentials are valid, and AA 230 generates and transmits a response. The response indicates that asset 155 is authenticated. As an example, the response may be an HTTPS 200 OK message.

The response may include an access token that permits asset 155 to query identity database 235. According to other examples, when the credentials are not valid, AA 230 generates and transmits a response that indicates that asset 155 is not authenticated. As an example, the response may be an HTTPS 401 unauthorized message. Additionally, the response may not include the access token.

In step 7, in response to receiving the response and the access token, asset 155 generates and transmits a query request to identity database 235 via AA 230. According to an exemplary implementation, the query request includes the network address information obtained in step 3, and the access token obtained in step 6. As an example, the query request may be an HTTPS GET request. In step 8, in response to receiving the query request, AA 230 determines whether the access token is valid. In the event AA 230 determines that the access token is not valid, AA 230 may generate and transmit a query response that indicates that asset 155 is not authorized. However, according to this example, assume that AA 230 determines that the access token is valid. AA 230 generates and transmits, in step 9, a query request to identity database 235. The query request includes the network address information.

Referring to FIG. 4B, in response to receiving the query request from AA 230, identity database 235, in step 10, uses the network address information as a key to perform a lookup. For example, identity database 235 compares the network address information included in the query request with one or multiple fields in database 500 that store network address information. Identity database 235 determines whether a match exists based on the lookup. In step 11, identity database 235 generates and transmits a query response based on the result of the lookup. In the event identity database 235 determines that a match does not exist, identity database 235 generates and transmits to AA 230 a query response that indicates no telephone number information exists. In response to receiving the query response, AA 230 generates and transmits the query response to asset 155. As an example, the query response may be an HTTPS 204 No Content message or an HTTPS 404 Not Found message. However, according to this example, assume identity database 235 determines that a match exists with respect to a profile 550 stored in database 500. Identity database 235 selects the mobile telephone number stored in mobile telephone number field 520, and generates and transmits a query response that includes the mobile telephone number (e.g., an MDN) of user 165 to AA 230. In step 12, in response to receiving the query response, AA 230 generates and transmits a query response to asset 155. The query response includes the mobile telephone number. As an example, the query response may be an HTTPS OK message. According to various exemplary implementations, AA 230 may or may not hash the mobile telephone number.

In step 13, asset 155 receives the query response from AA 230 and extracts the mobile telephone number. In step 14, asset 155 uses the mobile telephone number for one or multiple purposes. For example, as previously described, asset 155 may use the mobile telephone number for mobile advertising, fraud detection, account origination, authentication, or some other business use.

FIG. 6 is a diagram illustrating exemplary components of a device 600 that may correspond to one or more of the network elements and devices illustrated in environments 100 and 200. For example, device 600 may correspond to identity synchronizer 115, identity storage 120, AA 125, asset 155, end device 160, MME 218, SGW 219, PGW 220, AA 230, as well as other network elements and/or devices illustrated and described. As illustrated in FIG. 6, according to an exemplary embodiment, device 600 includes a bus 605, a processor 610, memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 615 may include a hard disk (e.g., a magnetic disk, an optical disk, a magneto-optic disk, a solid state disk, etc.) and a corresponding drive. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. Software 620 is also intended to include firmware, middleware, microcode, hardware description language (HDL), and/or other form of instruction. As an example, with reference to PGW 220, software 620 may include an application that, when executed by processor 610, provides the functions of the IP address and port-based identity service, as described herein. Additionally, with reference to other devices and/or network elements (e.g., AA 230, identity database 235, asset 155, etc.), software 620 may include an application that, when executed by processor 610, provides the functions of the IP address and port-based identity service, as described herein.

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a button, a switch, an input port, speech recognition logic, a microphone, a camera, and/or some other type of visual, auditory, tactile, etc., input component. Output 635 permits an output from device 600. For example, output 635 may include a speaker, a display, a light, an output port, and/or some other type of visual, auditory, tactile, etc., output component. According to some embodiments, input 630 and/or output 635 may be a device that is attachable to and removable from device 600.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
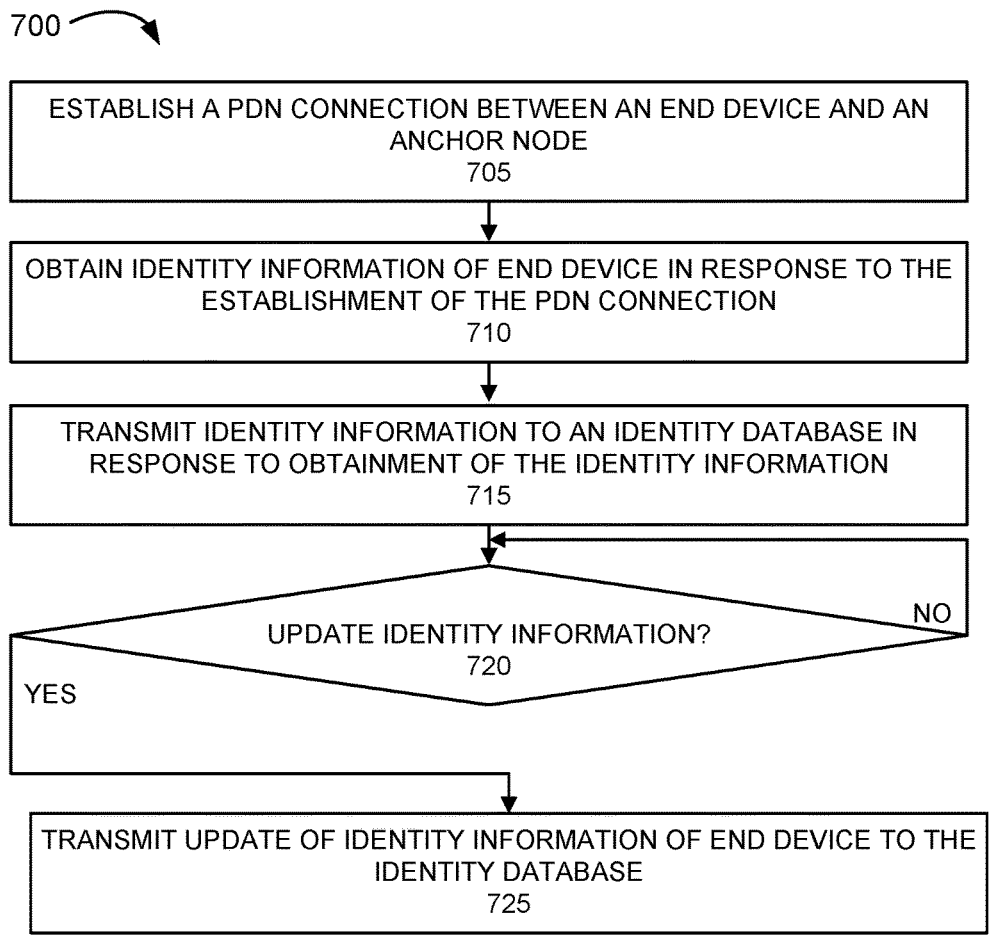
FIG. 7 is a flow diagram illustrating an exemplary process of the IP address and port-based identity service.

FIG. 7 is a flow diagram illustrating an exemplary process 700 pertaining to the IP address and port-based identity service. Process 700 is directed to a process previously described above with respect to FIGS. 1, 2, and 3, as well as elsewhere in this description, in which identity information is obtained and stored based on the establishment of a packet data network connection. According to an exemplary embodiment, an anchor node (e.g., a PGW, etc.), which includes identity synchronizer 115, performs steps of process 700. For example, processor 610 executes software 620 to perform the steps described.

Referring to FIG. 7, block 705, process 700 may begin with a packet data network connection established between an end device and an anchor node. For example, the anchor node establishes a packet data network connection with end device 160 in response to receiving a request to establish the packet data network connection. During the establishment of the packet data network connection, the anchor node assigns network address information to end device 160.

In block 710, identity information is obtained in response to the establishment of the packet data network connection. For example, the anchor node obtains the network address information, telephone number information and, a user identifier of user 165 and/or a device identifier of end device 160. For example, the anchor node obtains the telephone number information pertaining to user 165 of end device 160 from a database. Additionally, the anchor node may obtain a user identifier of user 165 and/or an end device identifier of end device 160 from a message received during a packet data network connection establishment procedure and/or the database. Further, the anchor node obtains the network address information during the assignment of the network address information to end device 160.

In block 715, the identity information is transmitted to an identity database in response to the obtainment of the identity information. For example, the anchor node generates a sync packet that includes the identity information. The anchor node transmits the sync packet to identity storage 120.

In block 720, it is determined whether the identity information is to be updated. For example, the anchor node may determine whether the packet data network connection is torn down. Alternatively, the anchor node may determine whether another packet data network connection is to be established and another assignment of network address information is to be performed.

When it is determined that the update information does not have to be updated (block 720—NO), process 700 may continue to or remain at block 720. When it is determined that the identity information is to be updated, an update to the identity information is transmitted to the identity database. For example, when the anchor node determines that the packet data network connection is torn down, the anchor node generates and transmits a sync packet that indicates the identity information is to be updated (block 725). The sync packet may include identity information or a portion thereof (e.g., a user identifier, a device identifier, etc.). Identity storage 120 may delete the identity information corresponding to the packet data network connection in response to receiving the update sync packet.

Although FIG. 7 illustrates an exemplary process 700 of the IP address and port-based identity service, according to other embodiments, process 700 may include additional operations, fewer operations, and/or different operations than those illustrated in FIG. 7 and described herein. For example, when the anchor node determines that another or new packet data connection, which includes network address information assignment, is to be established, the anchor node updates identity storage 120. For example, the anchor node performs blocks 705-715.

Figure 8A:
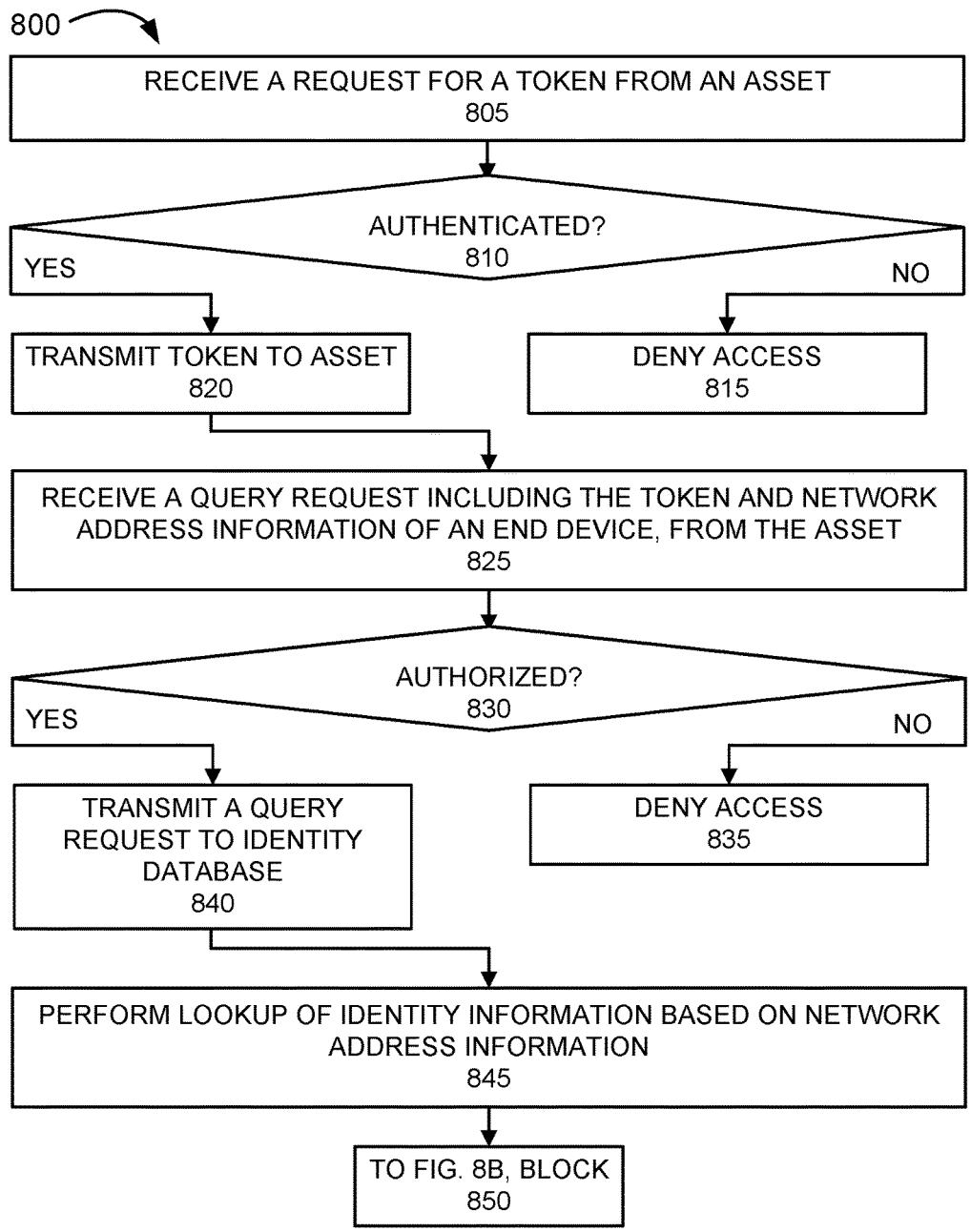
FIGS. 8A and 8B are flow diagrams that illustrate another exemplary process of the IP address and port-based identity service.
Figure 8B:
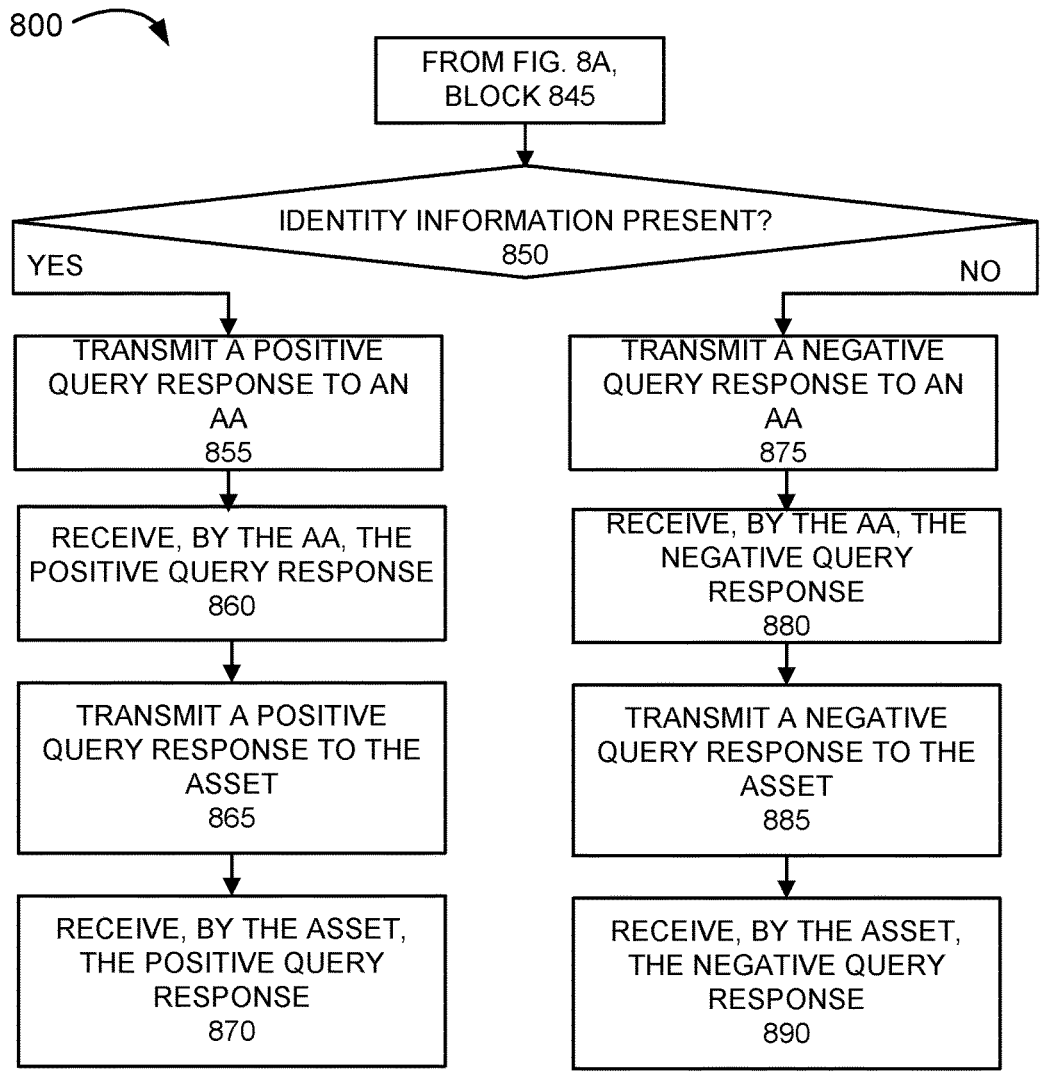

FIGS. 8A and 8B are flow diagrams illustrating an exemplary process 800 pertaining to the IP address and port-based identity service. Process 800 is directed to a process previously described above with respect to FIGS. 1, 2, 4A and 4B, as well as elsewhere in this description, in which identity information is provided to asset 155. According to an exemplary embodiment, identity storage 120 and AA 125, perform steps of process 800. For example, processor 610 executes software 620 to perform the steps described.

Referring to FIG. 8A, process 800 may begin, in block 805, in which a request for a token from an asset is received. For example, AA 125 receives a request to be authenticated from asset 155. The request includes credentials associated with the IP address and port-based identity service. In block 810, it is determined whether the credentials are valid. For example, AA 125 determines whether asset 155 is authenticated based on a comparison of the credentials with issued credentials stored in a database. When it is determined that the credentials are not valid (block 810—NO), access is denied (block 815). For example, when AA 125 determines that asset 155 cannot be authenticated or verified, AA 125 denies the request. AA 125 generates and transmits a packet indicating the error. When it is determined that the credentials are valid (block 810—YES), a token is transmitted. For example, AA 125 generates and transmits a response that includes the token (block 820).

In block 825, a query request including the token and network address information of an end device, from the asset. For example, AA 125 receives a query request, which includes the token and network address information, from asset 155.

In block 830, in response to receiving the query request, it is determined whether the asset is authorized. For example, AA 125 compares the token to issued tokens stored in a database. When it is determined that the token is not valid (block 830—NO), access is denied (block 835). For example, AA 125 generates and transmits a query response that indicates that access is denied. When it is determined that the token is valid (block 830—YES), a query request is transmitted to an identity database. For example, AA 125 generates and transmits a query request to identity storage 120. The query request includes the network address information of end device 160.

In block 845, in response to receiving the query request, a lookup of identity information is performed. For example, identity storage 120 performs a lookup using the network address information as a key.

Referring to FIG. 8B, it is determined whether identity information is present. For example, identity storage 120 determines whether telephone number information, mapped to the network address information, is stored in the identity database. When it is determined that the telephone number information is stored in the identity database (block 850—YES), a positive query response is transmitted to AA 125 (block 855). The positive query response includes the telephone number information associated with user 165 of end device 160. In response to receiving the positive query response, in step 860, AA 125 generates and transmits a positive query response to asset 155 (block 865). In block 870, asset 155 receives the positive query response, which carries the telephone number information.

When it is determined that the telephone number information is not stored in the identity database (block 850—NO), a negative query response is transmitted to AA 125 (block 875). In response to receiving the negative query response, in step 880, AA 125 generates and transmits a negative query response to asset 155 (block 885). In block 890, asset 155 receives the negative query response, which indicates that the telephone number information is not stored or available.

Although FIGS. 8A and 8B illustrate an exemplary process 800 of the IP address and port-based identity service, according to other embodiments, process 800 may include additional operations, fewer operations, and/or different operations than those illustrated in FIGS. 8A and 8B, and described herein.

Figure 9:
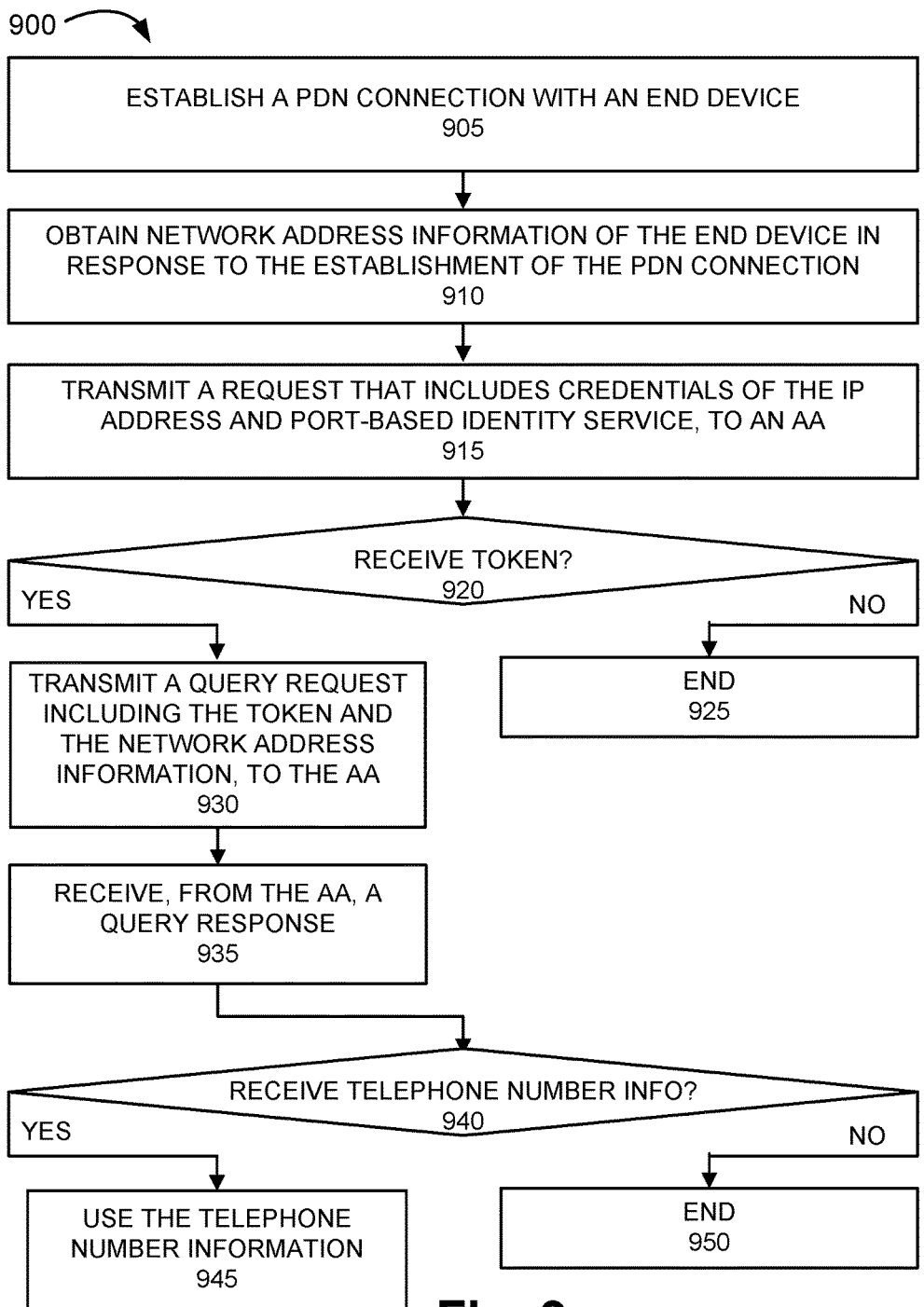
FIG. 9 is a flow diagram illustrating yet another exemplary process of the IP address and port-based identity service.

FIG. 9 is a flow diagram illustrating an exemplary process 900 pertaining to the IP address and port-based identity service. Process 700 is directed to a process previously described above with respect to FIGS. 1, 2, 4A, and 4B, as well as elsewhere in this description, in which identity information is requested by asset 155. According to an exemplary embodiment, asset 155 performs steps of process 900. For example, processor 610 executes software 620 to perform the steps described.

Referring to FIG. 9, block 905, process 900 may begin with a packet data network connection established with an end device. For example, asset 155 establishes a packet data network connection with end device 160.

In block 910, network address information is obtained in response to the establishment of the packet data network connection. For example, asset 155 obtains network address information of end device 160 in response to the establishment of the packet data network connection.

In block 915, a request that includes credentials of the IP address and port-based identity service is transmitted to an AA. For example, asset 155 generates and transmits a request for authentication to AA 125. The request includes credentials issued by the IP address and port-based identity service provider during a registration process.

In block 920, it is determined whether a token is received in response to the transmission of the request. For example, asset 155 receives a response to the request. Depending on the result of the authentication procedure performed by AA 125, the response may or may not include the token. For example, asset 155 may inspect the response to determine whether the response includes the token or not.

When it is determined that the response does not include the token (block 920—NO), process 900 may end (block 925). For example, asset 155 may generate and transmit an error message to an administrator of asset 155 that alerts the administrator that the credentials failed. When it is determined that the response includes the token (block 920—YES), a query request that includes the token and the network address information is transmitted to the AA (block 930). For example, asset 155 generates and transmits the query request to AA 125.

In block 935, a query response is received from the AA. For example, asset 155 receives a query response to the query request. In block 940, it is determined whether the query response includes telephone number information. For example, asset 155 may inspect the query response to determine whether the query response includes the telephone number information or not.

When it is determined that the query response includes the telephone number information (block 940—YES), the asset uses the telephone number information (block 945). For example, asset 155 may use the telephone number information for various purposes, such as mobile device advertising, fraud detection, account origination, authentication, or some other business use. When it is determined that the query response does not include the telephone number information (block 940—NO), the process may end (block 950).

Although FIG. 9 illustrates an exemplary process 900 of the IP address and port-based identity service, according to other embodiments, process 900 may include additional operations, fewer operations, and/or different operations than those illustrated in FIG. 9 and described herein.

The foregoing description of embodiments provides illustration, but is not intended to be exhaustive or to limit the embodiments to the precise form disclosed. Accordingly, modifications to the embodiments described herein may be possible.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 7, 8A, 8B, and 9, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 610, etc.), or a combination of hardware and software (e.g., software 620). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 610) of a computational device. A non-transitory storage medium includes one or more of the storage mediums described in relation to memory/storage 615.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
establishing, by a first network device, via a wireless network, a first packet data network connection with an end device, wherein the first network device assigns a network address and a port to the end device with respect to the establishment of the first packet data network connection, and wherein the first network device is a packet data network gateway of a core network;
obtaining, by the first network device and in response to the establishing, identity information of the end device, wherein the identity information includes a telephone number of a user of the end device, the network address and the port, and at least one of a user identifier of the user that uniquely identifies the user or a device identifier of the end device that uniquely identifies the end device;
generating, by the first network device, a message that includes the identity information in response to the obtaining; and
transmitting, by the first network device, the message that includes the identity information to a second network device, in response to the generating, and wherein the establishing, obtaining, generating, and transmitting occur prior to the end device establishing a connection with a destination device via the first network device and the first packet data network connection, and wherein the destination device provides at least one of an end user service or an end user application to the end device.

2. The method of claim 1, further comprising:
receiving, by the second network device, the message;
storing, by the second network device, the identity information in response to receiving the message;
establishing, by a third network device, a second packet data network connection with the end device in response to a request from the end device, wherein the second packet data network connection is via the first network device and includes the first packet data network connection, wherein the third network device is the destination device;
obtaining, by the third network device, the network address of the end device in response to establishing the second packet data network connection;
transmitting, by the third network device and to a fourth network device, a first request to authenticate the third network device, wherein the first request includes credentials pertaining to an identity service in which the third network device is registered;
receiving, by the fourth network device, the first request; and
determining, by the fourth network device, whether the credentials are valid in response to receiving the first request.

3. The method of claim 2, further comprising:
transmitting, by the fourth network device and to the third network device, a first response to the first request, wherein the first response includes a token, in response to determining that the credentials are valid;
receiving, by the third network device, the first response;
determining, by the third network device, whether the first response includes the token; and
transmitting, by the third network device and to the fourth network device, a second request that includes the token and, the network address and the port of the end device.

4. The method of claim 3, further comprising:
receiving, by the fourth network device, the second request;
determining, by the fourth network device, whether the token is valid in response to receiving the second request; and
transmitting, by the fourth network device and to the second network device, a third request that includes the network address and the port of the end device, wherein the second network device is configured to expose a web service that permits the third network device to query for the identity information.

5. The method of claim 4, further comprising:
receiving, by the second network device, the third request;
performing, by the second network device, a lookup of the telephone number of the user of the end device based on the network address and the port, in response to receiving the third request;
determining, by the second network device, whether the second network device stores the telephone number in response to the performing; and
transmitting, by the second device and to the fourth network device, a response that includes the telephone number in response to determining that the telephone number is stored by the second network device.

6. The method of claim 5, further comprising:
receiving, by the fourth network device, the response that includes the telephone number;
transmitting, by the fourth network device and to the third network device, the response that includes the telephone number in response to receiving the response from the second device;
receiving, by the third network device, the response that includes the telephone number;
determining, by the third network device, whether the response includes the telephone number; and
using, by the third network device, the telephone number in response to determining that the response includes the telephone number, wherein the using includes issuing an advertisement text message to the end device.

7. The method of claim 1, further comprising:
determining, by the first network device, whether the identity information is to be updated, subsequent to transmitting the message; and
transmitting, by the first network device, an update message to the second network device in response to determining that the identity information is to be updated.

8. The method of claim 7, further comprising:
determining, by the first network device, whether the first packet data network connection with the end device is torn down.

9. A system comprising:
a first network device, comprising
a first communication interface;
a first memory, wherein the first memory stores first instructions; and
a first processor, wherein the first processor executes the first instructions to:

establish, via the first communication interface and a
wireless network, a first packet data network connection with an end device, wherein the establishment of the first packet data network connection
includes an assignment of a network address and
a port to the end device, and wherein the first
network device is a packet data network gateway
of a core network;

obtain identity information of the end device in
response to the establishment of the first packet
data network connection, wherein the identity
information includes a telephone number of a user
of the end device, the network address and the
port, and at least one of a user identifier of the user
that uniquely identifies the user or a device identifier of the end device that uniquely identifies the
end device;

generate a message that includes the identity information in response to the obtainment of the identity information; and transmit, via the first communication interface, the
message that includes the identity information to a
second network device, in response to the obtainment of the identity information, and wherein the
establish, obtain, generate, and transmit occur
prior to the end device establishing a connection
with a destination device via the first network
device and the first packet data network connection, and wherein the destination device provides
at least one of an end user service or an end user
application to the end device.

10. The system of claim 9, and wherein the system further comprises:
a second network device comprising:
a mass storage;
a second communication interface;
a second memory, wherein the second memory stores
second instructions; and
a second processor, wherein the second processor
executes the second instructions to:
store multiple instances of identity information associated with multiple users and end devices in the
mass storage;
receive, via the second communication interface, the
message; and
store the identity information in the mass storage,
and wherein the system further comprises:
a third network device comprising:
a third communication interface;
a third memory, wherein the third memory stores third
instructions; and
a third processor, wherein the third processor executes
the third instructions to:
receive, via the third communication interface, a first
request from a fourth network device, to authenticate the fourth network device, wherein the first
request includes credentials pertaining to an identity service in which the fourth network device is
registered, and wherein the fourth network device
is the destination device; and
determine whether the credentials are valid in
response to receipt of the first request.

11. The system of claim 10, wherein the third processor
further executes the third instructions to:
transmit, via the third communication interface and to the
fourth network device, a first response to the first
request in response to a determination that the credentials are valid, wherein the first response includes a
token; and receive, by the third communication interface and from
the fourth network device, a second request that
includes the token and, the network address and the
port of the end device.

12. The system of claim 11, wherein the third processor
further executes the third instructions to:
determine whether the token is valid in response to the
receipt of the second request; and
transmit, via the third communication interface and to the
second network device, a third request that includes the
network address and the port of the end device.

13. The system of claim 12, wherein the second processor
further executes the second instructions to:
receive, via the second communication interface, the third
request;
perform a lookup of the telephone number of the user of
the end device based on the network address and the
port, in response to the receipt of the third request;
determine whether the telephone number is stored in the
mass storage in response to the performance of the
lookup; and
transmit, via the second communication interface and to
the third network device, a response that includes the
telephone number in response to a determination that
the telephone number is stored in the mass storage, and
wherein the third processor further executes the third
instructions to:
receive, via the third communication interface, the
response; and
transmit, via the third communication interface and to the
fourth network device, the response.

14. The system of claim 9, wherein the core network is a
Long Term Evolution (LTE) core network or an LTE-Advanced core network, and wherein the first processor
further executes the first instructions to:
determine whether the identity information is to be
updated, subsequent to the transmission of the message; and
transmit, via the first communication interface, an update
message to the second network device in response to a
determination that the identity information is to be
updated.

15. The system of claim 14, wherein when determining
whether the identity information is to be updated, the first
processor further executes the first instructions to:
determine whether the first packet data network connection with the end device is torn down, and wherein
when transmitting the update message, the first processor further executes the first instructions to:
transmit the update message to the second network device
in response to a determination that the first packet data
network connection with the end device is torn down.

16. A non-transitory, computer-readable storage medium
storing instructions executable by a processor of a computational device, which when executed cause the computational device to:
establish, via a wireless network, a first packet data
network connection with an end device, wherein the
establishment of the first packet data network connection includes an assignment of a network address and a
port to the end device, and wherein the computational
device is a packet data network gateway of a core
network;

obtain identity information of the end device in response to the establishment of the first packet data network connection, wherein the identity information includes a telephone number of a user of the end device, the network address and the port, and at least one of a user identifier of the user that uniquely identifies the user or a device identifier of the end device that uniquely identifies the end device;

generate a message that includes the identity information in response to the obtainment of the identity information; and transmit the message that includes the identity information to a network device, in response to the obtainment of the identity information, and wherein the establish, obtain, generate, and transmit occur prior to the end device establishing a connection with a destination device via the computational device and the first packet data network connection, and wherein the destination device provides at least one of an end user service or an end user application to the end device.

17. The non-transitory, computer-readable storage medium of claim 16, the instructions to obtain further comprise instructions to:

access and query a database, wherein the database stores mappings between user identifiers and telephone numbers of users; and determine whether the telephone number of the user is stored in the database in response to the query; and obtain the telephone number of the user in response to a determination that the telephone number is stored in the database.

18. The non-transitory, computer-readable storage medium of claim 16, the instructions further comprising instructions to:

determine whether the identity information is to be updated, subsequent to the transmission of the message; and transmit an update message to the network device in response to a determination that the identity information is to be updated.

19. The non-transitory, computer-readable storage medium of claim 18, the instructions further comprising instructions to:

determine whether the first packet data network connection with the end device is torn down, and wherein the instructions to transmit the update message further comprise instructions to:

transmit the update message to the network device in response to a determination that the first packet data network connection with the end device is torn down.

20. The non-transitory, computer-readable storage medium of claim 16, wherein the first packet data network connection is for use by the end device to establish one or more Hypertext Transfer Protocol (HTTP)-based sessions with one or more network devices that correspond to the connection and the destination device.

* * * * *